United States Patent
Qian et al.

(10) Patent No.: US 11,604,101 B2
(45) Date of Patent: Mar. 14, 2023

(54) TEMPERATURE MEASURING CIRCUIT AND MEASURING METHOD THEREOF

(71) Applicants: Gree Electric Appliances (Wuhan) Co., Ltd, Wuhan (CN); Gree Electric Appliances, Inc. of Zhuhai, Zhuhai (CN)

(72) Inventors: Pei Qian, Zhuhai (CN); Xiantao Zhu, Zhuhai (CN); Wenbo Liu, Zhuhai (CN); Baolin Zhou, Zhuhai (CN); Wanxing Chen, Zhuhai (CN); Shuanglin Guo, Zhuhai (CN); Haibin Liu, Zhuhai (CN); Zifeng Liang, Zhuhai (CN); Guohui Hu, Zhuhai (CN); Luping Zhong, Zhuhai (CN); Yanjun Peng, Zhuhai (CN)

(73) Assignees: Gree Electric Appliances (Wuhan) Co., Ltd., Hubei (CN); Gree Electric Appliances, Inc. of Zhuhai, Guangdong (CN)

( * ) Notice: Subject to any disclaimer, the term of this patent is extended or adjusted under 35 U.S.C. 154(b) by 362 days.

(21) Appl. No.: 16/652,332

(22) PCT Filed: Dec. 27, 2017

(86) PCT No.: PCT/CN2017/118938
§ 371 (c)(1),
(2) Date: Mar. 30, 2020

(87) PCT Pub. No.: WO2019/071844
PCT Pub. Date: Apr. 18, 2019

(65) Prior Publication Data
US 2020/0355561 A1    Nov. 12, 2020

(30) Foreign Application Priority Data
Oct. 11, 2017  (CN) .......................... 201710940980.7

(51) Int. Cl.
G01K 7/00 (2006.01)
G01K 7/20 (2006.01)
G01K 7/34 (2006.01)

(52) U.S. Cl.
CPC ................. G01K 7/20 (2013.01); G01K 7/34 (2013.01)

(58) Field of Classification Search
CPC combination set(s) only.
See application file for complete search history.

(56) References Cited

U.S. PATENT DOCUMENTS 4,623,266 A * 11/1986 Kielb ....................... G01K 7/13
374/E7.024
7,712,958 B2 * 5/2010 Burmeister ............ G01K 15/00
327/512

(Continued)

FOREIGN PATENT DOCUMENTS

CN   101806640 A    8/2010
CN   102012279 A  * 4/2011   ............... G01K 7/22

(Continued)

*Primary Examiner* — Lisa M Caputo
*Assistant Examiner* — Nasir U. Ahmed
(74) *Attorney, Agent, or Firm* — The Webb Law Firm (57) ABSTRACT

A temperature measuring circuit, measuring apparatus and a measuring method thereof relating to the field of electronic circuits. The temperature measuring circuit includes control unit, wherein the control unit includes a first current output interface, a second current output interface, a first input/output interface, a second input/output interface, and a third input/output interface. Further, the first current output interface and the first input/output interface of the control unit are respectively electrically connected to a first interface of a temperature sensor; the second current output interface and the second input/output interface of the control unit are respectively electrically connected to a second interface of the temperature sensor; and the third input/output interface (Continued)

of the control unit is electrically connected to a third interface of the temperature sensor.

17 Claims, 4 Drawing Sheets

(56) References Cited

U.S. PATENT DOCUMENTS

| | | |
|---|---|---|
| 2008/0279255 A1 | 11/2008 | Burmeister et al. |
| 2014/0056329 A1 | 2/2014 | Alley |
| 2015/0198486 A1 | 7/2015 | Mitsui |
| 2016/0076928 A1 | 3/2016 | Hauzeray |

FOREIGN PATENT DOCUMENTS

| | | | |
|---|---|---|---|
| CN | 102012279 A | 4/2011 | |
| CN | 202928712 U | 5/2013 | |
| CN | 204694370 U | 10/2015 | |
| CN | 207231660 U | 4/2018 | |
| EP | 1431768 A1 | 6/2004 | |
| JP | 2011249771 A * | 12/2011 | ......... H05B 33/0812 |
| KR | 1020130104747 A | 9/2013 | |

\* cited by examiner

TEMPERATURE MEASURING CIRCUIT AND MEASURING METHOD THEREOF

CROSS-REFERENCE TO RELATED APPLICATIONS

This application is the U.S. national phase of International Application No. PCT/CN2017/118938 filed Dec. 27, 2017, and claims priority to Chinese patent application No. 201710940980.7, filed Oct. 11, 2017, the disclosures of which are hereby incorporated in their entirety by reference.

Field of the Invention

The present disclosure relates to the field of electronic circuits, and particularly relates to a temperature measuring circuit capable of being compatible with temperature sensors having two-wire and three-wire interfaces and a measuring method thereof.

Description of Related Art

Compared with other temperature sensors, PT100 temperature sensors have the advantages of high accuracy, good stability and strong anti-interference ability in the temperature range of −50° C.~600° C. The temperature measuring circuits of PT100 temperature sensors are mostly constant current source circuits or bridge circuits.

The inventors found that, for PT100 temperature sensors in different wiring manners, such as in two-wire and three-wire connections, the temperature measuring circuits used by the hardware are different.

SUMMARY OF THE INVENTION

One technical problem to be solved by the embodiments of the present disclosure is: the problem about the compatibility between temperature measuring circuits used for temperature sensors with two-wire and three-wire interfaces.

According to an aspect of the present disclosure, a temperature measuring circuit is provided, comprising: a control unit comprising a first current output interface, a second current output interface, a first input/output interface, a second input/output interface, and a third input/output interface; wherein the first current output interface and the first input/output interface of the control unit are respectively electrically connected to a first interface of a temperature sensor; the second current output interface and the second input/output interface of the control unit are respectively electrically connected to a second interface of the temperature sensor; and the third input/output interface of the control unit is electrically connected to a third interface of the temperature sensor.

According to another aspect of the present disclosure, a measuring method of a temperature measuring circuit is provided, comprising: controlling a first current output interface and a second current output interface of a control unit to respectively output currents of the same level; detecting a differential signal between a second input/output interface and a third input/output interface of the control unit; if the differential signal is at a high level, determining that the temperature sensor through which the currents flows is a temperature sensor in a two-wire connection; if the differential signal is at a low level, determining that the temperature sensor through which the currents flows is a temperature sensor in a three-wire connection.

According to another aspect of the present disclosure, a measuring apparatus of a temperature measuring circuit is provided, comprising: memory; and a processor coupled to the memory, the processor configured to carry out the measuring method of a temperature measuring circuit in any embodiment based on instructions stored in the memory.

According to another aspect of the present disclosure, a measuring apparatus of a temperature measuring circuit is provided, comprising: a control module, configured to control a first current output interface and a second current output interface of the control unit to respectively output currents of the same level; a detection module, configured to detect a differential signal between a second input/output interface and a third input/output interface of the control unit; a determining module, configured to determine that the temperature sensor through which the current flows is a temperature sensor in a two-wire connection if the differential signal is at a high level, and determine that the temperature sensor through which the current flows is a temperature sensor in a three-wire connection if the differential signal is at a low level.

According to another aspect of the present disclosure, non-transitory computer-readable storage medium storing computer programs is provided, the computer programs being executed by a processor to implement the measuring method of a temperature measuring circuit in any embodiment.

BRIEF DESCRIPTION OF THE DRAWINGS

The drawings needed to be used in the description of the embodiments or related art will be briefly introduced below. The present disclosure can be more clearly understood from the following detailed description with reference to the accompanying drawings.

It is obvious that, the drawings illustrated as follows are merely some of the embodiments of the present disclosure. A person skilled in the art may also acquire other drawings according to the disclosed drawings inventive effort.

DESCRIPTION OF THE INVENTION

Below, a clear and complete description will be given for the technical solution of embodiments of the present disclosure with reference to the drawings of the embodiments.

As mentioned above, some temperature sensors have different wiring methods. For example, platinum thermal resistance temperature sensors such as PT100, PT1000, etc. have two-wire and three-wire connections. These temperature sensors in different wiring connections use different temperature measuring circuits, resulting in a compatibility issue accordingly. Thus, the present disclosure provides a temperature measuring circuit capable of being compatible with temperature sensors having two-wire and three-wire interfaces. In addition, through detecting the high and low voltages of the differential signal at the specified interfaces, it is determined whether the current temperature sensor is in a two-wire connection or a three-wire connection.

A temperature measuring circuit, as a logical division, comprises a current source output function, a temperature sensor sampling function, a reference function (comprising internal reference and external reference), a filtering function, a communication function, etc. The temperature measuring circuit and its various logic functions will be described in detail below with reference to FIG. 1.

Figure 1:
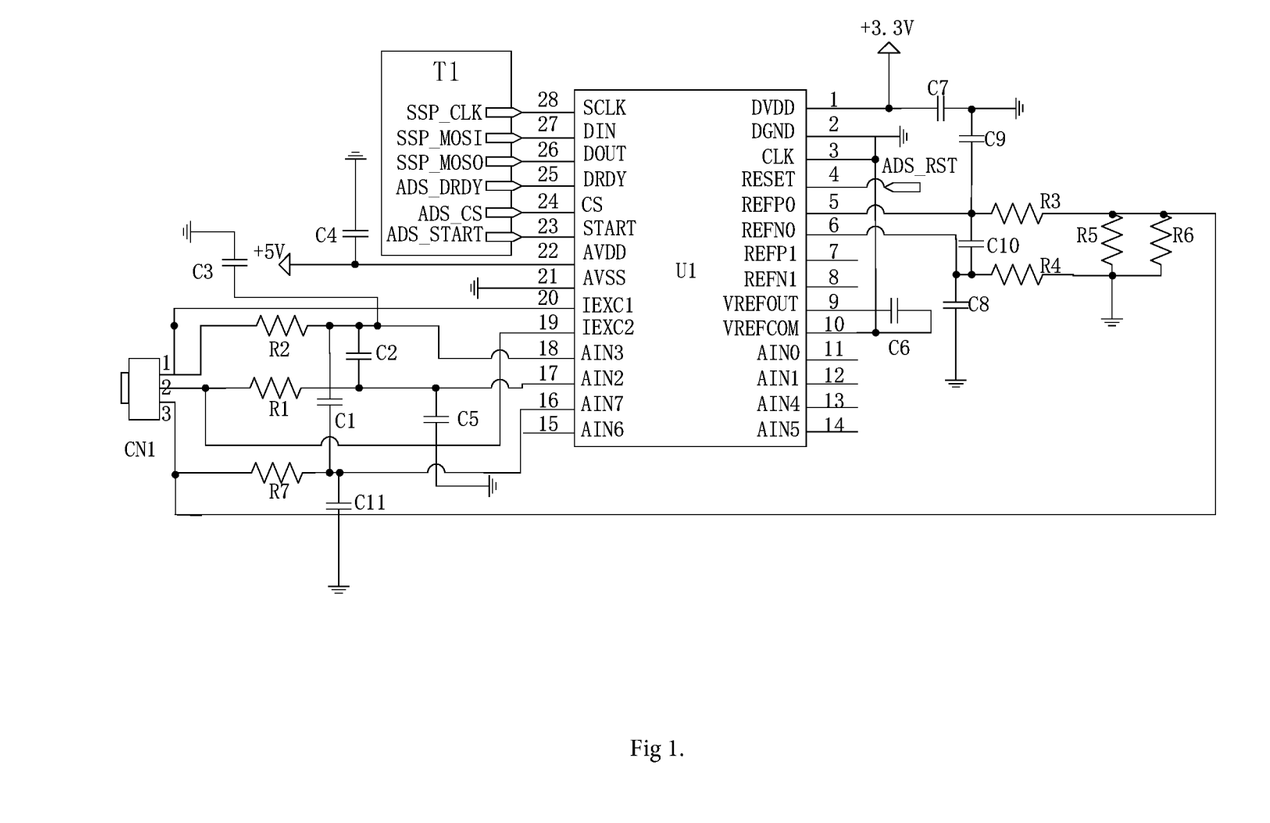
FIG. 1 is a schematic diagram of a temperature measuring circuit according to some embodiments of the present disclosure.

FIG. 1 is a schematic diagram of a temperature measuring circuit according to some embodiments of the present disclosure.

As shown in FIG. 1, the temperature measuring circuit in some embodiments comprises: a control unit U1, which is used to implement the temperature collection and transmission control function of the temperature sensor. The control unit U1 may be implemented by using a logic chip having a sampling function, a current source output function, a reference output function, and a communication function, such as ADS1128, ADS1146, ADS1148, etc., but is not limited to the examples given above.

The interfaces of the control unit U1, as shown in FIG. 1, comprise, for example, a first current output interface IEXC1 (interface 20) and a second current output interface IEXC2 (interface 19). The interfaces of the control unit U1 also comprise several input/output interfaces (such as interfaces 11~18). In some embodiments, three interfaces with an analog-to-digital conversion function are selected as the first input/output interface AIN3 (interface 18), the second input/output interface AIN2 (interface 17) and third input/output interface AIN7 (interface 16). These interfaces are used to connect with the temperature sensor CN1 to achieve the temperature measurement of the temperature sensor CN1. Other input/output interfaces AIN6, AIN5, AIN4, AIN1, AIN0 (interfaces 11~15) may be left unused or may be electrically connected to other temperature sensors to achieve temperature measurement of other temperature sensors. These input/output interfaces (such as interfaces 11~18) may work in parallel, and the collected temperature information may be transmitted to the temperature conversion unit T1 for temperature conversion, thereby alleviating the resource shortage of the analog-to-digital conversion interface of the temperature conversion unit T1. The interfaces of the control unit U1 also comprise a positive internal reference output interface VREFOUT (interface 9), a negative internal reference output interface VREFCOM (interface 10), a positive external reference input interface REFP0 (interface 5) and a negative external reference input interface REFN0 (interface 6), which may cooperate with other electronic components to provide a stable internal reference or external reference for the temperature measuring circuit. The interfaces of the control unit U1 also comprise communication interfaces (such as interfaces 23~28) for communicating with the temperature conversion unit T1. The output interface DOUT (interface 26) is connected to the SSP_MOSO interface of the temperature conversion unit T1, and is used to output a differential signal sampling value between the first input/output interface AIN3 (interface 18) and the third input/output interface AIN7 (interface 16) to the temperature conversion unit T1, so that the temperature conversion unit T1 converts it into a temperature. The input interface DIN (interface 27) is connected to the SSP_MOSI interface of the temperature conversion unit T1, and is used by the temperature conversion unit T1 to input a configuration instruction to the control unit U1, so that the control unit U1 may output excitation currents of different levels. The communication interfaces also comprise, for example, a clock interface SCLK (interface 28), a data preparation output interface DRDY (interface 25), an enable interface CS (interface 24), a start control interface START (interface 23), and the like, which are connected to the SSP_CLK, ADS_DRDY, ADS_CS, ADS_START of the temperature conversion unit T1 respectively, and are used by the temperature conversion unit T1 to send corresponding control instructions to the control unit U1. The interfaces of the control unit U1 also comprise power interfaces, such as an analog power AVDD (interface 22), an analog ground AVSS (interface 21), a digital power DVDD (interface 1), and a digital ground DGND (interface 2). The interfaces of the control unit U1 also comprise a clock interface CLK (interface 3), a reset interface RESET (interface 4), and a positive external reference input interface REFP1 (interface 7) and a negative external reference input interface REFN1 (interface 8) that are left unused.

The connection relationship between the control unit U1 and the temperature sensor CN1 is shown in FIG. 1: the first current output interface IEXC1 (interface 20) and the first input/output interface AIN3 (interface 18) of the control unit U1 are electrically connected to the first interface CN1-1 of the temperature sensor CN1 respectively, the second current output interface IEXC2 (interface 19) and the second input/output interface AIN2 (interface 17) of the control unit U1 are electrically connected to the second interface CN1-2 of the temperature sensor CN1 respectively, and the third input/output interface AIN7 (interface 16) of the control unit U1 is electrically connected to the three interfaces CN1-3 of the temperature sensor CN1. Optionally, in order to protect the circuit, a resistor R2 may also be disposed between the first input/output interface AIN3 (interface 18) of the control unit U1 and the first interface CN1-1 of the temperature sensor CN1, a resistor R1 may be disposed between the second input/output interface AIN2 (interface 17) of the control unit U1 and the second interface CN1-2 of the temperature sensor CN1, and a resistor R7 may be disposed between the third input/output interface AIN7 (interface 16) of the control unit U1 and the third interface CN1-3 of the temperature sensor CN1.

It can be seen that the temperature sensor in three-wire connection requires two current sources provided by the first current output interface IEXC1 (interface 20) and the second current output interface IEXC2 (interface 19) respectively. The advantage of three-wire connection is that currents are applied to the wires of equal length of the first interface CN1-1 and the second interface CN1-2 of the temperature sensor CN1 respectively, which may eliminate the influence of the wire resistance. The temperature sensor in two-wire connection requires one current source, which is provided by the first current output interface IEXC1 (interface 20). However, another current source provided by the second current output interface IEXC2 (interface 19) is extracted from the hardware, which is connected to the second interface CN1-2 of the temperature sensor CN1, and returns to the second input/output interface AIN2 (17 interface) of the control unit U1 through R1. Thus, the temperature measuring circuit can achieve hardware compatible for temperature sensors with two-wire and three-wire interfaces.

Figure 2:
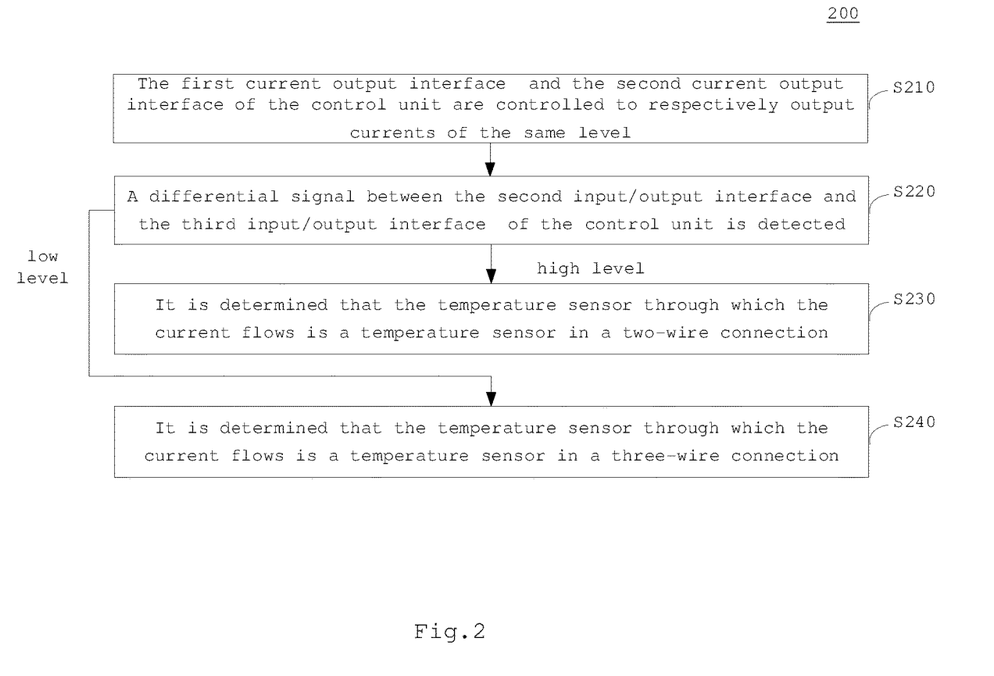
FIG. 2 is a schematic flowchart of a measuring method of a temperature measuring circuit of the present disclosure.

On the basis of the foregoing hardware compatibility, it may be determined through logic judgment whether the temperature sensor CN1 adopts a two-wire connection or a three-wire connection. A measuring method 200 of a temperature measuring circuit is shown in FIG. 2, which particularly comprises the following steps.

In step S210, the first current output interface IEXC1 (interface 20) and the second current output interface IEXC2 (interface 19) of the control unit U1 are controlled to respectively output currents of the same level, for example, both are 1 mA.

In step S220, a differential signal between the second input/output interface AIN2 (interface 17) and the third input/output interface AIN7 (interface 16) of the control unit U1 is detected; if the differential signal is at a high level (that is, if the level of the differential signal is higher than a preset value), step S230 is executed, and if the differential signal is at a low level (that is, if the level of the differential signal is lower than the preset value), step S240 is executed.

In step S230, if the differential signal is at a high level, it is determined that the temperature sensor through which the current flows is a temperature sensor in a two-wire connection.

In step S240, if the differential signal is at a low level, it is determined that the temperature sensor through which the current flows is a temperature sensor in a three-wire connection.

Thus, the temperature measuring circuit can achieve software compatible for temperature sensors with two-wire and three-wire interfaces. The temperature measuring circuit detects a differential signal, so that it has a strong anti-interference ability.

Figure 5:
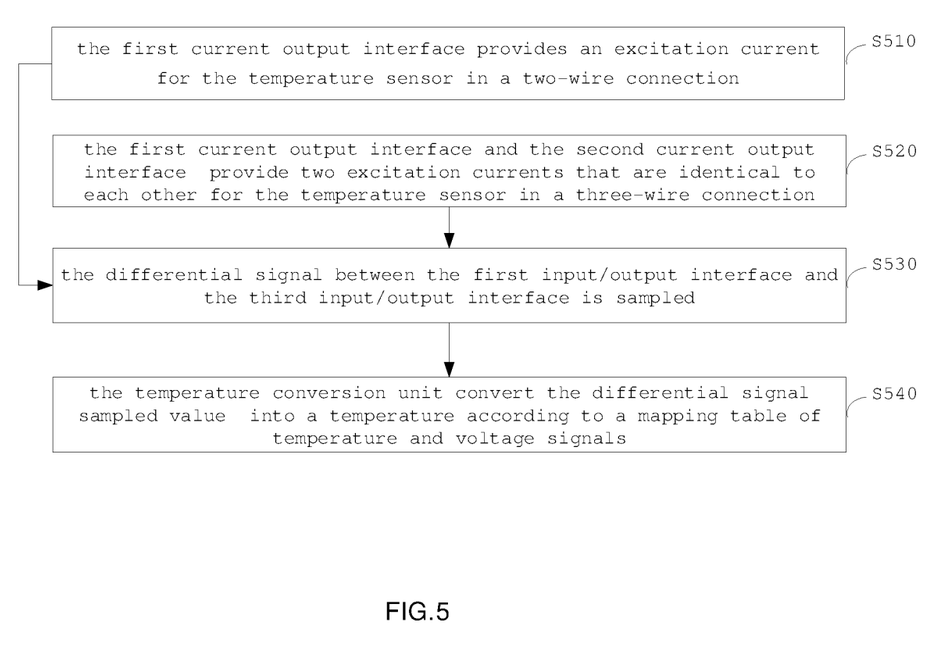
FIG. 5 is a schematic flowchart of a measuring method of a temperature measuring circuit according to some embodiments of the present disclosure.

After it is determined that the temperature sensor adopts a two-wire connection or a three-wire connection, shown in FIG. 5, the temperature measuring circuit may perform temperature measurement in the following manner.

First, in step S510, if the temperature sensor adopts a two-wire connection, the first current output interface IEXC1 (interface 20) of the control unit U1 provides an excitation current for the temperature sensor in a two-wire connection; in step S520, if the temperature sensor adopts a three-wire connection, the first current output interface IEXC1 (interface 20) and the second current output interface IEXC2 (interface 19) of the control unit U1 provide two excitation currents that are identical to each other for the temperature sensor in a three-wire connection.

Next, after the excitation current flows through the temperature sensor CN1, it passes through the first input/output interface AIN3 (interface 18) and the third input/output interface AIN7 (interface 16) of the control unit U1 to form a loop. In step S530, the differential signal between the first input/output interface AIN3 (interface 18) and the third input/output interface AIN7 (interface 16) of the control unit U1 is sampled, and the differential signal sampled value is output to the temperature conversion unit T1.

Finally, in step S540, the temperature conversion unit T1 may, for example, convert the differential signal sampled value into a temperature according to a mapping table of temperature and voltage signals.

The above temperature measurement process detects a differential signal, so that the temperature measuring circuit has a strong anti-interference ability.

Figure 6:
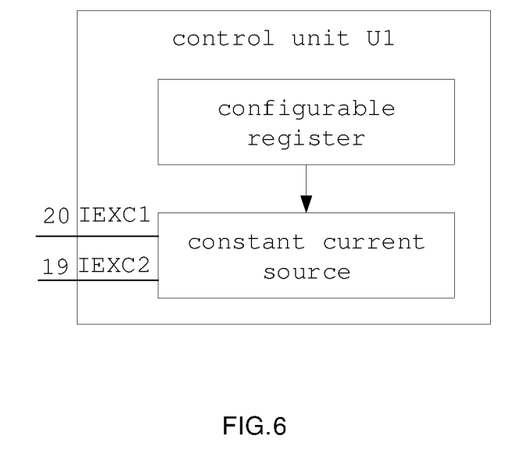
FIG. 6 is a schematic diagram of a control unit according to some embodiment of the present disclosure.

The current source output function of the temperature measuring circuit is realized by the first current output interface IEXC1 (interface 20) and the second current output interface IEXC2 (interface 19) of the control unit U1. In the control unit U1, the first current output interface IEXC1 (interface 20) and the second current output interface IEXC2 (interface 19) may be constant current source interfaces. Thus, as shown in FIG. 6, the control unit U1 further comprises a constant current source and a configurable register. The first current output interface IEXC1 (interface 20) and the second current output interface IEXC2 (interface 19) of the control unit are electrically connected to the constant current source. The constant current source is electrically connected to the configurable register. The configurable register may output different control signals to the constant current source to excite the constant current source to output currents of different levels. The corresponding relationship between the configurable register output and the level of the constant current source is, for example, 000=off, 001=50 µA, 110=1000 µA, and 111=1500 µA, but it is not limited to this example.

Therefore, a stable excitation current is generated inside the control unit, so that the temperature measuring circuit is not easy to fluctuate due to the influence of the external environment, which is conducive to improving the detection accuracy.

The internal reference function of the temperature measuring circuit: the positive internal reference output interface VREFOUT (interface 9) and the negative internal reference output interface VREFCOM (interface 10) in the control unit U1 are combined with a capacitor C6 in the temperature measuring circuit to serve the internal reference function, and provide a stable internal reference for the temperature measuring circuit. As shown in FIG. 1, the negative internal reference output interface VREFCOM (interface 10) is grounded, and a capacitor C6 is disposed between the positive internal reference output interface VREFOUT (interface 9) and the negative internal reference output interface VREFCOM (interface 10).

Therefore, the temperature measuring circuit uses a stable internal reference as a reference, which is not easy to fluctuate due to the influence of the external environment, and is conducive to improving the detection accuracy.

External reference function of the temperature measuring circuit: the positive external reference input interface REFP0 (interface 5) and the negative external reference input interface REFN0 (interface 6) in the control unit U1 are combined with the high-precision resistance network in the temperature measuring circuit to serve an external reference function, which provides an external reference for the temperature measuring circuit. As shown in FIG. 1, the positive external reference input interface REFP0 (interface 5) is electrically connected to the third input/output interface AIN7 (interface 16). A resistance network is disposed on a connection line between the positive external reference input interface REFP0 (interface 5) and the negative external reference input interface REFN0 (interface 6). A resistance network with an accuracy higher than a preset value may be used, for example, the accuracy is 0.1%. The resistance network may be implemented, for example, by the parallel resistors R5 and R6 shown in FIG. 1. When the excitation current is 1000 µA, the external reference voltage value $V_{ref}=(1000 \times R5 \times R6)/(R5+R6)$.

Filter function of the temperature measuring circuit: it is realized by a filter circuit to suppress interference. The filter circuit may be logically divided into three parts: a power filter circuit for filtering the power supply, a sample input filter circuit for filtering a differential signal, and a reference filter circuit for filtering an external reference.

The power filter circuit is shown as filter capacitors C4 and C7 in FIG. 1, which respectively filter the analog power supply and digital power supply. The filter capacitor C4 is disposed on a circuit line between the analog power AVDD (interface 22) and the ground, and the filter capacitor C7 is disposed on a circuit line between the digital power DVDD (interface 1) and the ground.

The sampling input filter circuit is shown as filter capacitors C1, C2, C3, C5, and C11 in FIG. 1. The filter capacitors C3, C5, and C11 each are respectively electrically connected between the first input/output interface AIN3 (interface 18) and the ground, between the second input/output interface AIN2 (interface 17) and the ground, and between the third input/output interface AIN7 (interface 16) and ground. The filter capacitor C2 is electrically connected between the first input/output interface AIN3 (interface 18) and the second input/output interface AIN2 (interface 17). The filter capacitor C1 is electrically connected between the first input/output interface AIN3 (interface 18) and the third input/output interface AIN7 (interface 16).

The reference filter circuit is a first filter circuit formed by R3 and C9 in FIG. 1 and a second filter circuit formed by R4 and C8. The capacitor C9 in the first filter circuit is disposed on a circuit line between the positive external reference input interface of the control unit and the ground, and the resistor R3 in the first filter circuit is disposed on a circuit line between the capacitor C9 and the resistance network (the parallel circuit of R5 and R6) in the first filter circuit. The capacitor C8 in the second filter circuit is disposed on a circuit line between the negative external reference input interface of the control unit and the ground. The resistor R4 in the second filter circuit is disposed on the circuit line between the capacitor C8 and the resistance network (the parallel circuit of R5 and R6) in the second filter circuit.

Figure 3:
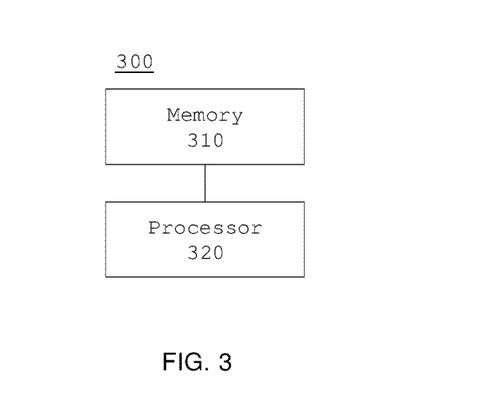
FIG. 3 is a schematic diagram of a measuring apparatus of a temperature measuring circuit according to some embodiments of the present disclosure.

FIG. 3 is a schematic diagram of a measuring apparatus for a temperature measuring circuit according to some embodiments of the present disclosure.

As shown in FIG. 3, a measuring apparatus 300 of a temperature measuring circuit in some embodiments comprises:
a memory 310; and
a processor 320 coupled to the memory 310, the processor 320 being configured to execute the measuring method of the temperature measuring circuit according to any one of the foregoing embodiments based on instructions stored in the memory 310.

In some embodiments, the memory 310 may comprise, for example, a system memory, a fixed non-volatile storage medium, and the like. The system memory stores, for example, an operating system, application programs, a boot loader, and other programs.

Figure 4:
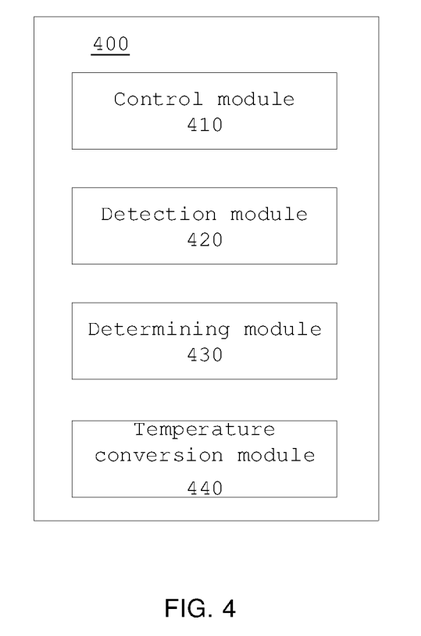
FIG. 4 is a schematic diagram of a measuring apparatus of a temperature measuring circuit according to other embodiments of the present disclosure.

FIG. 4 is a schematic diagram of a measuring apparatus for a temperature measuring circuit according to other embodiments of the present disclosure.

As shown in FIG. 4, the measuring apparatus 400 of a temperature measuring circuit in some embodiments comprises:
a control module 410, configured to control a first current output interface and a second current output interface of the control unit to respectively output currents of the same level;
a detection module 420, configured to detect a differential signal between a second input/output interface and a third input/output interface of the control unit;
a determining module 430, configured to determine that the temperature sensor through which the current flows is a temperature sensor in a two-wire connection if the differential signal is at a high level, and determine that the temperature sensor through which the current flows is a temperature sensor in a three-wire connection if the differential signal is at a low level.

As shown in FIG. 4, the measuring apparatus 400 of a temperature measuring circuit in some embodiments further comprises: a temperature conversion module 440, configured to perform temperature conversion based on an outputted differential signal sampling value between the first input/output interface and the third input/output interface of the control unit; the control module 410 is configured to control the first current output interface of the control unit to provide an excitation current to the temperature sensor in a two-wire connection, and control the first current output interface and the second current output interface of the control unit to provide two currents that are identical to each other to the temperature sensor in a three-wire connection.

The present disclosure also proposes a computer-readable storage medium storing computer programs, the computer programs being executed by a processor to implement the measuring method of a temperature measuring circuit according to any one of the foregoing embodiments.

Those skilled in the art should understand that the embodiments of the present disclosure may be provided as a method, a system, or a computer program product. Therefore, embodiments of the present disclosure can take the form of entirely hardware embodiments, entirely software embodiments or embodiments containing both hardware and software elements. Moreover, the present disclosure may take the form of a computer program product embodied on one or more computer-usable non-transitory storage media (comprising but not limited to disk storage, CD-ROM, optical memory, etc.) containing computer-usable program code therein.

The above is merely some embodiments of this disclosure, and is not limitation to this disclosure. Within the spirit and principles of this disclosure, any modification, replacement, improvement and etc. shall be contained in the protection scope of this disclosure.

What is claimed is:

1. A temperature measuring circuit, comprising:
a control unit, comprising a first current output interface, a second current output interface, a first input/output interface, a second input/output interface, and a third input/output interface;
wherein the first current output interface and the first input/output interface of the control unit are respectively electrically connected to a first interface of a temperature sensor; the second current output interface and the second input/output interface of the control unit are respectively electrically connected to a second interface of the temperature sensor; and the third input/output interface of the control unit is electrically connected to a third interface of the temperature sensor;
a second filter capacitor electrically connected between the second input/output interface and the ground, and
a third filter capacitor electrically connected between the third input/output interface and the ground.

2. The temperature measuring circuit according to claim 1, wherein
the control unit further comprises an output interface for outputting a differential signal sampling value between the first input/output interface and the third input/output interface;
the temperature measuring circuit further comprises a temperature conversion unit capable of converting the differential signal sampling value into a temperature, the temperature conversion unit being electrically connected to the output interface of the control unit.

3. The temperature measuring circuit according to claim 1, wherein the control unit further comprises a positive internal reference output interface and a negative internal reference output interface, the negative internal reference output interface being grounded;

the temperature measuring circuit further comprises a capacitor connected in series between the positive internal reference output interface and negative internal reference output interface.

4. The temperature measuring circuit according to claim 1, wherein the control unit further comprises a positive external reference input interface and a negative external reference input interface, the positive external reference input interface being electrically connected to the third input/output interface;

the temperature measuring circuit further comprises a resistance network with an accuracy higher than a preset value, the resistance network being disposed on a connection line between the positive external reference input interface and the negative external reference input interface.

5. The temperature measuring circuit according to claim 4, wherein the temperature measuring circuit further comprises a first filter circuit and a second filter circuit, each of the first filter circuit and the second filter circuit comprising a resistor and a capacitor;

the capacitor in the first filter circuit is disposed on a circuit line between the positive external reference input interface of the control unit and a ground; the resistor in the first filter circuit is disposed on a circuit line between the capacitor in the first filter circuit and the resistance network;

the capacitor in the second filter circuit is disposed on a circuit line between the negative external reference input interface of the control unit and the ground; the resistor in the second filter circuit is disposed on a circuit line between the capacitor in the second filter circuit and the resistance network.

6. The temperature measuring circuit according to claim 1, wherein the first current output interface and the second current output interface of the control unit are constant current source interfaces.

7. The temperature measuring circuit according to claim 6, wherein the control unit further comprises a constant current source and a configurable register;

the first current output interface and the second current output interface of the control unit are respectively electrically connected to the constant current source, the constant current source being electrically connected to the configurable register, the configurable register outputting different control signals to the constant current source to excite the constant current source to output currents of different levels.

8. The temperature measuring circuit according to claim 1, wherein the temperature measuring circuit further comprises a first filter capacitor electrically connected between the first input/output interface of the control unit and the ground;

a fourth filter capacitor electrically connected between the first input/output interface and the second input/output interface; and a fifth filter capacitor electrically connected between the first input/output interface and the third input/output interface.

9. The temperature measuring circuit according to claim 1, wherein the control unit further comprises several other input/output interfaces than the first input/output interface, the second input/output interface, and the third input/output interface, the other input/output interfaces being electrically connected to other temperature sensors than the temperature sensor.

10. The temperature measuring circuit according to claim 1, wherein the temperature sensor is a platinum thermal resistance temperature sensor.

11. A measuring method of the temperature measuring circuit according to claim 1, comprising:

controlling the first current output interface and the second current output interface of the control unit to respectively output currents of the same level at the same time;

detecting a differential signal between the second input/output interface and the third input/output interface of the control unit;

if the differential signal is at a high level, determining that the temperature sensor through which the currents flows is a temperature sensor in a two-wire connection;

if the differential signal is at a low level, determining that the temperature sensor through which the currents flows is a temperature sensor in a three-wire connection.

12. The measuring method according to claim 11, further comprising:

if the temperature sensor is a temperature sensor in a two-wire connection, controlling the first current output interface of the control unit to provide an excitation current for the temperature sensor in a two-wire connection, and performing temperature conversion based on an outputted differential signal sampling value between the first input/output interface and the third input/output interface of the control unit;

if the temperature sensor is a temperature sensor in a three-wire connection, controlling the first current output interface and the second current output interface of the control unit to provide two currents that are identical to each other to the temperature sensor in a three-wire connection, and performing temperature conversion based on an outputted differential signal sampling value between the first input/output interface and the third input/output interface of the control unit.

13. A measuring apparatus of a temperature measuring circuit, comprising:

memory; and a processor coupled to the memory, the processor configured to carry out the measuring method of a temperature measuring circuit according to claim 11 based on instructions stored in the memory.

14. A measuring apparatus of the temperature measuring circuit according to claim 1, comprising:

the control module, configured to control the first current output interface and the second current output interface of the control unit to respectively output currents of the same level at the same time;

a detection module, configured to detect a differential signal between the second input/output interface and the third input/output interface of the control unit;

a determining module, configured to determine that the temperature sensor through which the current flows is a temperature sensor in a two-wire connection if the differential signal is at a high level, and determine that the temperature sensor through which the current flows is a temperature sensor in a three-wire connection if the differential signal is at a low level.

15. The measuring apparatus according to claim 14, further comprising:
a temperature conversion module, configured to perform temperature conversion based on an outputted differential signal sampling value between the first input/output interface and the third input/output interface of the control unit;
wherein the control module is configured to control the first current output interface of the control unit to provide an excitation current to the temperature sensor in a two-wire connection, and control the first current output interface and the second current output interface of the control unit to provide two currents that are identical to each other to the temperature sensor in a three-wire connection.

16. A non-transitory computer-readable storage medium storing computer programs, the computer programs being executed by a processor to implement the following steps:
controlling a first current output interface and a second current output interface of a control unit to respectively output currents of the same level at the same time;
detecting a differential signal between a second input/output interface and a third input/output interface of the control unit;
if the differential signal is at a high level, determining that the temperature sensor through which the currents flows is a temperature sensor in a two-wire connection;
if the differential signal is at a low level, determining that the temperature sensor through which the currents flows is a temperature sensor in a three-wire connection.

17. The storage medium according to claim 16, wherein the computer programs being executed by a processor further to implement the following steps:
if the temperature sensor is a temperature sensor in a two-wire connection, controlling the first current output interface of the control unit to provide an excitation current for the temperature sensor in a two-wire connection, and performing temperature conversion based on an outputted differential signal sampling value between the first input/output interface and the third input/output interface of the control unit;
if the temperature sensor is a temperature sensor in a three-wire connection, controlling the first current output interface and the second current output interface of the control unit to provide two currents that are identical to each other to the temperature sensor in a three-wire connection, and performing temperature conversion based on an outputted differential signal sampling value between the first input/output interface and the third input/output interface of the control unit.

* * * * *